United States Patent
Ishikawa et al.

(10) Patent No.: US 12,554,481 B2
(45) Date of Patent: Feb. 17, 2026

(54) VEHICLE AND SOFTWARE UPDATE SYSTEM

(71) Applicant: TOYOTA JIDOSHA KABUSHIKI KAISHA, Toyota (JP)

(72) Inventors: Tomoyasu Ishikawa, Nagoya (JP); Hiroshi Inoue, Nagoya (JP); Shunsuke Tanimori, Arlington, VA (US); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 18/483,297

(22) Filed: Oct. 9, 2023

(65) Prior Publication Data

US 2024/0126535 A1 Apr. 18, 2024

(30) Foreign Application Priority Data

Oct. 17, 2022 (JP) .................. 2022-166086

(51) Int. Cl.
*G06F 8/65* (2018.01)
*G06F 1/3212* (2019.01)

(52) U.S. Cl.
CPC .............. *G06F 8/65* (2013.01); *G06F 1/3212* (2013.01)

(58) Field of Classification Search
CPC ....... H04L 67/34; H04L 2209/84; G06F 8/65; G06F 8/61; G06F 1/3212
See application file for complete search history.

(56) References Cited

U.S. PATENT DOCUMENTS

| 2013/0174137 A1* | 7/2013 | Kim .................... G06F 3/04842 717/171 |
| 2016/0013934 A1* | 1/2016 | Smereka .................. H04L 9/32 713/171 |
| 2019/0332371 A1 | 10/2019 | Kobayashi |

(Continued)

FOREIGN PATENT DOCUMENTS

| JP | 2003087863 A | 3/2003 |
| JP | 2017149323 A | 8/2017 |
| JP | 2018100002 A | 6/2018 |

OTHER PUBLICATIONS

Di Lena, Pietro, et al. "In-vehicle human machine interface: an approach to enhance eco-driving behaviors." Proceedings of the 2017 ACM workshop on interacting with smart objects. 2017. Retrieved from the Internet <https://dl.acm.org/doi/pdf/10.1145/3038450.3038455> (Year: 2017).*

(Continued)

*Primary Examiner* — S. Sough
*Assistant Examiner* — Cheneca Smith
(74) *Attorney, Agent, or Firm* — Dickinson Wright, PLLC

(57) ABSTRACT

A vehicle including an electronic control unit configured to update software, the vehicle includes: a communication unit configured to communicate with user equipment; and a control unit configured to request the user equipment to display on a display unit of the user equipment, a first operation unit that is used when a user accepts download of software distributed from a server in a case where the software is downloaded to the vehicle via the user equipment, and a charge level of a battery of the user equipment.

7 Claims, 8 Drawing Sheets

(56) References Cited

U.S. PATENT DOCUMENTS

2020/0174778 A1* 6/2020 David .................... H04W 4/80

OTHER PUBLICATIONS

Hermann, David S., and Sandhya Singh. "User experience and HMI technologies for the future." 2020 27th International Workshop on Active-Matrix Flatpanel Displays and Devices (AM-FPD). IEEE, 2020. Retrieved from the Internet <https://ieeexplore.ieee.org/stamp/stamp.jsp?tp=&arnumber=9224505> (Year: 2020).*

* cited by examiner

FIG. 2
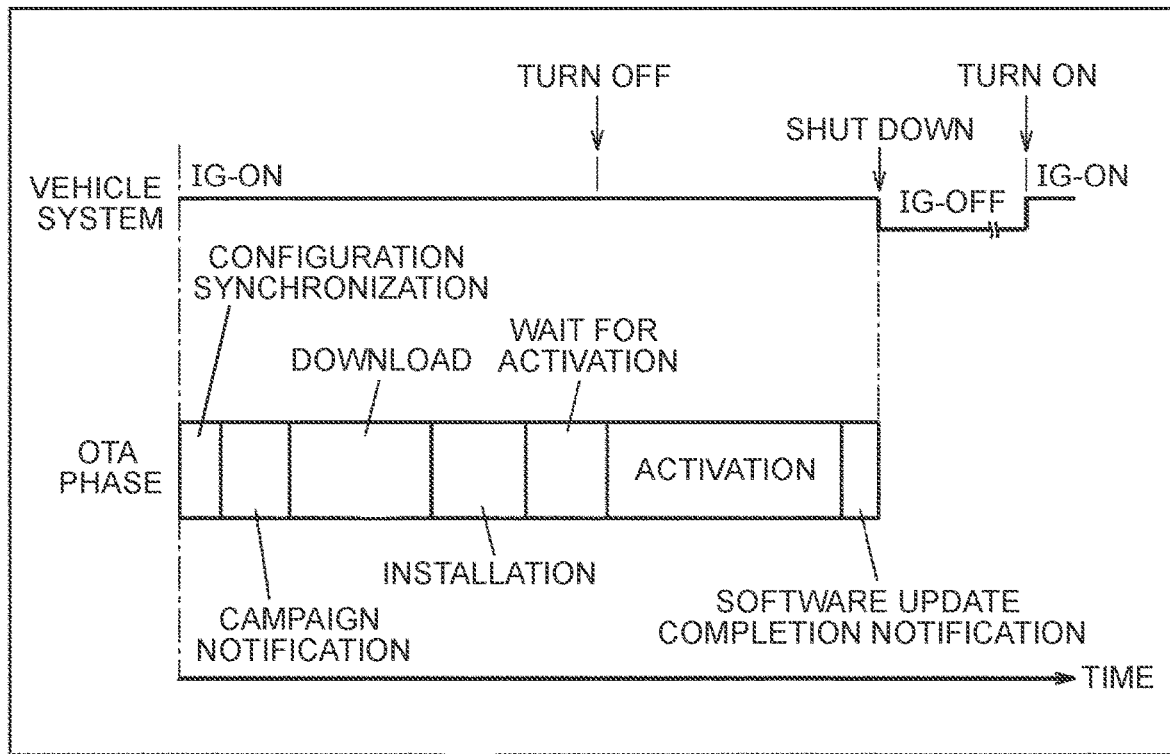
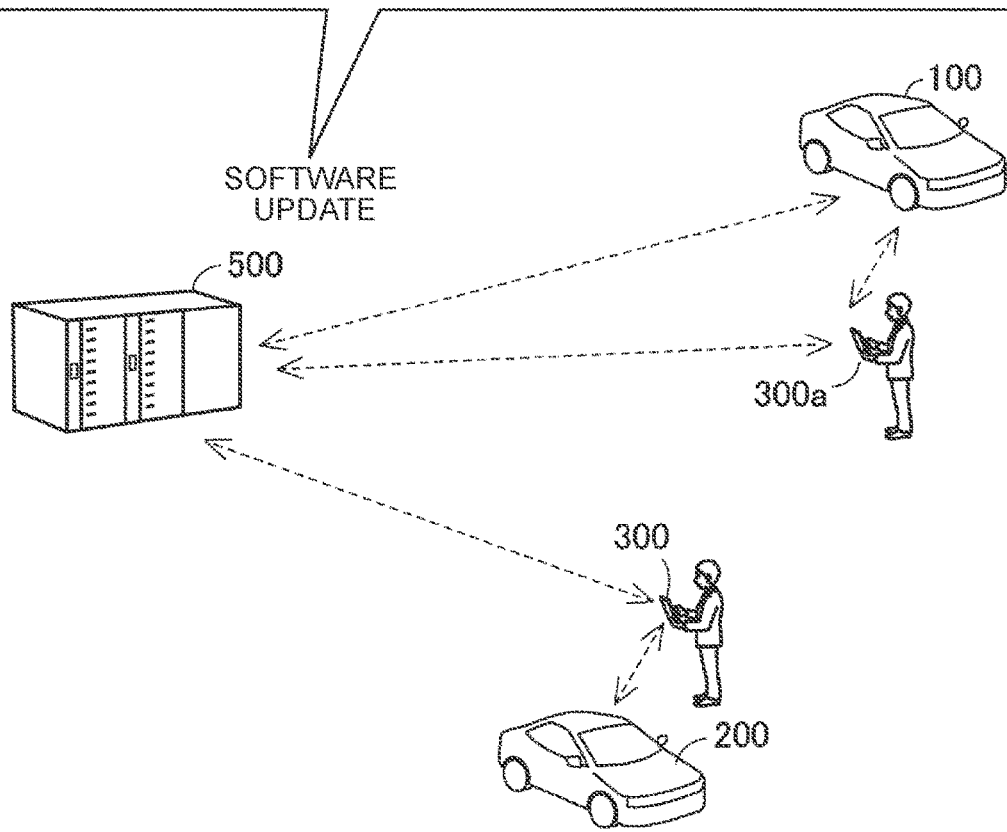

VEHICLE AND SOFTWARE UPDATE SYSTEM

CROSS-REFERENCE TO RELATED APPLICATION

This application claims priority to Japanese Patent Application No. 2022-166086 filed on Oct. 17, 2022, incorporated herein by reference in its entirety.

BACKGROUND

1. Technical Field

The present disclosure relates to vehicles and software update systems.

2. Description of Related Art

Japanese Unexamined Patent Application Publication No. 2017-149323 (JP 2017-149323 A) discloses a technique of updating software on an electronic control unit (ECU) installed in a vehicle by Over-The-Air (OTA) technology.

SUMMARY

A vehicle can download new software (data) for an in-vehicle ECU by wirelessly communicating with an external server (e.g., an OTA center). In the vehicle, the target ECU (ECU whose software is to be updated) then sequentially performs installation and activation of the downloaded software. A software update can thus be performed.

For example, when updating software (control program) using such OTA technology, software is downloaded from the OTA center via an in-vehicle communication device (e.g., a communication module such as a Data Communication Module (DCM)) or equipment owned by a user (user equipment; e.g., mobile equipment such as a smartphone).

When performing a software update process on an in-vehicle ECU, it is preferable to inquire of the user whether to accept the update process (software download), and perform the software update process when accepted by the user. Examples of an object (device) with which the user performs an accept operation in response to the inquiry as to whether to accept the update process include a human-machine interface (HMI) device installed in the vehicle and user equipment. When the update process is performed with software downloaded via the user equipment, performing the accept operation using the HMI device even though the user has the user equipment at hand may be a hassle for the user.

The present disclosure provides a vehicle and software update system that can improve user convenience when performing a software update process on an in-vehicle ECU via user equipment.

(1) A vehicle according to a first aspect of the present disclosure is a vehicle including an electronic control unit configured to update software, the vehicle comprising one or more processor configured to: communicate with user equipment; and when software distributed from a server is downloaded to the vehicle via the user equipment, request the user equipment to display on the user equipment, a first operation button that is used when a user accepts download of the distributed software, and a charge level of a battery of the user equipment.

According to this configuration, the communication unit of the vehicle can communicate with the user equipment and can download the software distributed from the server to the vehicle via the user equipment. When the software distributed from the server is downloaded to the vehicle via the user equipment, the control unit of the vehicle requests the user equipment to display on the display unit of the user equipment the first operation unit for accepting the download and the charge level of the battery of the user equipment. When the software is downloaded via the user equipment, the user equipment is requested to accept the download. The user can therefore perform an accept operation using the user equipment the user has at hand. This can improve user convenience. The user can also take the charge level of the battery displayed on the display unit of the user equipment into consideration before operating the first operation unit to accept the download. This can reduce the possibility of the battery of the user equipment running out during the software download.

(2) In (1), the vehicle may further include a human-machine interface, wherein the one or more processor may be configured to display a second operation button on the human-machine interface when a predetermined condition is satisfied, the second operation button being an operation button that is used when the user accepts the download.

According to this configuration, when the predetermined condition is satisfied, the control unit displays on the display unit of the HMI unit the second operation unit for accepting the download. The user can therefore accept the download by operating the second operation unit displayed on the display unit of the HMI device. This can further improve user convenience and facilitate the software update process. The predetermined condition may be, for example, when the software saved in a storage unit of the user equipment fails to be sent to the vehicle and installation is not completed.

(3) In (2), the one or more processor may be configured to: perform the download without requesting the user equipment to accept the download in a case where the charge level of the battery of the user equipment is equal to or higher than a first predetermined value when the download is accepted by operating the second operation button, and request the user equipment to accept the download in a case where the charge level of the battery of the user equipment is less than the first predetermined value when the download is accepted by operating the second operation button.

According to this configuration, the user equipment is requested to accept the download in the case where the charge level of the battery of the user equipment is less than the first predetermined value when the user accepts the download by operating the second operation unit displayed on the HMI device. Accordingly, when the charge level of the battery of the user equipment is less than the first predetermined value and is not high enough to download the software, the user is requested to operate the user equipment to perform an accept operation. This motivates the user to perform the accept operation after checking the charge level of the battery of the user equipment. In the case where the charge level of the battery of the user equipment is equal to or higher than the first predetermined value when the user accepts the download by operating the second operation unit displayed on the HMI device, the download is performed without requesting the user equipment to accept the download. Accordingly, user convenience is less likely to be reduced.

(4) A software update system that updates software on an electronic control unit, the software update system includes: a server configured to distribute software; a vehicle equipped with the electronic control unit; and user equipment configured to communicate with the server and the vehicle, wherein the vehicle is configured to, when the software is downloaded to the vehicle via the user equipment, perform download of the software when a user accepts the download by operating the user equipment.

According to this configuration, the software update system can download the software distributed from the server to the vehicle via the user equipment configured to communicate with the server and the vehicle, and can update software on the ECU installed in the vehicle. When downloading the software to the vehicle via the user equipment, the software update system performs the download when the user accepts the download by operating the user equipment. When downloading the software via the user equipment, the download is performed when the user accepts the download by operating the user equipment. The user can therefore perform an accept operation using the user equipment the user has at hand. This can improve user convenience.

(5) In (4), the user equipment may be configured to display on the user equipment a first operation button that is used when the user accepts the download, and a charge level of a battery of the user equipment.

According to this configuration, the first operation unit for accepting the download and the charge level of the battery of the user equipment are displayed on the display unit of the user equipment. The user can therefore take the charge level of the battery displayed on the display unit of the user equipment into consideration before operating the first operation unit to accept the download. This can reduce the possibility of the battery of the user equipment running out during the software download.

(6) In (4), the vehicle may include a human-machine interface; and the vehicle may be configured to display a second operation button on the human-machine interface when a predetermined condition is satisfied, the second operation button being an operation button that is used when the user accepts the download.

According to this configuration, when the predetermined condition is satisfied, the second operation unit for accepting the download is displayed on the display unit of the HMI device. The user can therefore accept the download by operating the second operation unit displayed on the display unit of the HMI device. This can further improve user convenience and facilitate the software update process. The predetermined condition may be, for example, when the software saved in the storage unit of the user equipment has not been sent to the vehicle for a predetermined period of time, or when the available capacity of the storage unit of the user equipment has become less than a predetermined value.

(7) In (6), the software update system may be configured to perform the download without any operation on the user equipment in a case where charge level of battery of the user equipment is equal to or higher than a first predetermined value when the download is accepted by operating the second operation button, and perform the download when the user accepts the download by operating the user equipment in a case where the charge level of the battery of the user equipment is less than the first predetermined value when the download is accepted by operating the second operation button.

According to this configuration, in the case where the charge level of the battery of the user equipment is less than the first predetermined value when the download is accepted by operating the second operation unit displayed on the HMI device, the download is performed when the user accepts the download by operating the user equipment. Accordingly, in the case where the charge level of the battery of the user equipment is less than the first predetermined value and is not high enough to download the software, the download is performed when the user accepts the download by operating the user equipment. This motivates the user to perform the accept operation after checking the charge level of the battery of the user equipment. In the case where the charge level of the battery of the user equipment is equal to or higher than the first predetermined value when the user accepts the download by operating the second operation unit displayed on the HMI device, the download is performed without any operation on the user equipment. Accordingly, user convenience is less likely to be reduced.

(8) In (4), the vehicle may include a human-machine interface; the vehicle may be configured not to display charge level of battery of the user equipment on the human-machine interface in a case where the vehicle includes a one or more processor configured to communicate with the server; and the vehicle may be configured to display the charge level of the battery of the user equipment on the human-machine interface in a case where the vehicle does not include the one or more processor configured to communicate with the server.

According to this configuration, in the case where the vehicle includes the communication unit configured to communicate with the server, the charge level of the battery of the user equipment is not displayed on the HMI device. When the vehicle is configured to communicate with the server, the vehicle sometimes downloads the software distributed from the server without via the user equipment and performs the software update process. Therefore, in the case where the vehicle includes the communication unit configured to communicate with the server, the charge level of the battery of the user equipment is not displayed on the HMI device. This eliminates the need to transfer the information on the charge level of the battery of the user equipment need between the vehicle and the user equipment, and can thus reduce the communication load. In the case where the vehicle does not include the communication unit configured to communicate with the server, the charge level of the battery of the user equipment is displayed on the HMI device. In the case where the vehicle does not include the communication unit configured to communicate with the server, the software is downloaded via the user equipment. Therefore, displaying the charge level of the battery of the user equipment on the HMI device allows the user to easily check the charge level of the battery of the user equipment when performing an operation of accepting the download. This can reduce the possibility of the battery of the user equipment running out during the software download.

According to the present disclosure, user convenience can be improved when performing a software update process on an in-vehicle ECU via user equipment.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 illustrates an overview of a software update method according to the embodiment;

DETAILED DESCRIPTION OF EMBODIMENTS

An embodiment of the present disclosure will be described in detail with reference to the drawings. The same or corresponding parts are denoted by the same signs throughout the drawings, and description thereof will not be repeated.

Figure 1:
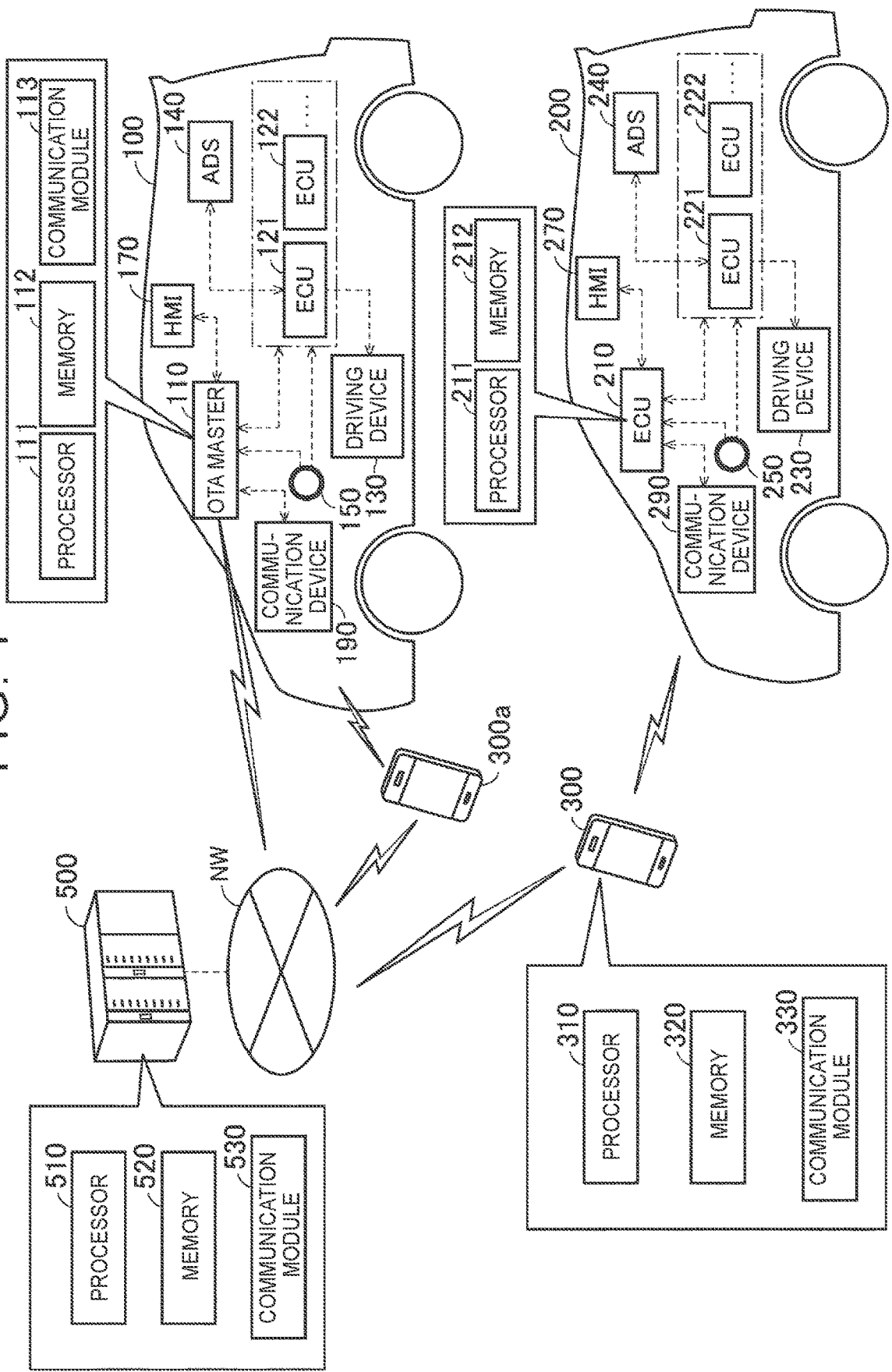
FIG. 1 shows the configuration of a software update system according to an embodiment of the present disclosure.

FIG. 1 shows the configuration of a software update system according to the present embodiment. Referring to FIG. 1, this software update system includes a vehicle 100, a vehicle 200, user equipment 300, user equipment 300a, and an OTA center 500. "OTA" is an abbreviation for "Over The Air."

Each of the vehicles 100, 200 is, for example, a battery electric vehicle (BEV) without an internal combustion engine. The vehicle 100 has an OTA access function (function to wirelessly communicate directly with the OTA center 500), but the vehicle 200 does not have the OTA access function. The vehicle 100 can wirelessly communicate directly with the OTA center 500, but the vehicle 200 cannot communicate with the OTA center 500 without via another communication device (i.e., a communication device different from that mounted on the vehicle 200 itself). The vehicle 200 wirelessly communicates with the OTA center 500 through the user equipment 300 (via the user equipment 300). The vehicle 100 can wirelessly communicate directly with the OTA center 500, and can also wirelessly communicate with the OTA center 500 via the user equipment 300a.

Since the user equipment 300 and the user equipment 300a have the same configuration, the user equipment 300 will be described below. The user equipment 300 is configured to be carried around by a user. The user equipment 300 is mobile equipment that is carried and operated by a user of the vehicle 200 (vehicle manager). In the present embodiment, smartphones with a touch panel display (display unit) are used as the user equipment 300. The smartphone contains a computer and has a speaker function. However, the user equipment 300 is not limited to this, and any equipment that can be carried by the user of the vehicle 200 can be used as the user equipment 300. For example, a laptop, a tablet, a portable gaming device, or a wearable device (such as a smartwatch, smart glasses, or smart gloves) can also be used as the user equipment 300.

The user equipment 300 includes a processor 310, a memory 320, and a communication module 330. The processor 310 includes, for example, a central processing unit (CPU). The memory 320 includes a non-volatile memory such as a flash memory. The communication module 330 includes a communication interface (I/F) for direct wireless communication with the OTA center 500. The communication module 330 also includes a communication OF for direct wireless communication with the vehicle 200. The vehicle 200 and the OTA center 500 can thus send and receive data to and from each other via the user equipment 300. For example, the user equipment 300 specifies the address of the OTA center 500 and accesses a communication network NW in response to a request from the vehicle 200. The vehicle 200 (ECU 210) can thus send and receive data to and from (communicate with) the OTA center 500 via the user equipment 300.

Application software (hereinafter referred to as "mobile app") for using a service provided by the OTA center 500 is installed in the user equipment 300. Identification information (equipment identification (ID)) of the user equipment 300 is registered in the OTA center 500 in association with identification information (vehicle ID) of the vehicle 200 through the mobile app. The user equipment 300 can send and receive information to and from the OTA center 500 through the mobile app.

The user equipment 300a is mobile equipment that is carried and operated by a user of the vehicle 100. Identification information (equipment ID) of the user equipment 300a is registered in the OTA center 500 in association with identification information (vehicle ID) of the vehicle 100 through a mobile app installed in the user equipment 300a, and the user equipment 300a can send and receive information to and from the OTA center 500 through the mobile app. The touch panel display of the user equipment 300 and the touch panel display of the user equipment 300a function as both an input device and a display device. The user equipment 300 and the user equipment 300a have the same functions. The user equipment 300 may be linked to the vehicle 100 and may be carried and operated by the user of the vehicle 100, and the user equipment 300a may be linked to the vehicle 200 and may be carried and operated by the user of the vehicle 200.

The OTA center 500 is a server that provides a vehicle software update service using the OTA technology. The OTA center 500 is configured to perform a software update on an in-vehicle ECU remotely from the OTA center 500 via a communication section. The OTA center 500 distributes software for the in-vehicle ECU. The term "ECU" means an electronic control unit.

The OTA center 500 includes a processor 510, a memory 520, and a communication module 530. The processor 510 includes, for example, a CPU. The memory 520 includes a non-volatile memory such as a flash memory. The communication module 530 is connected to the communication network NW by wire, and communicates with each of a plurality of vehicles (including the vehicle 100) and a plurality of pieces of mobile equipment (including the user equipment 300) via the communication network NW. The communication network NW is a wide area network formed by, for example, the Internet and wireless base stations. The communication network NW may include a mobile phone network.

The vehicle 100 includes an OTA master 110 and a plurality of ECUs (including ECUs 121, 122). The vehicle 200 includes a plurality of ECUs (including ECUs 210, 221, and 222). The OTA master 110 contains a computer and functions as an in-vehicle diagnostic device. Each vehicle may include any number of ECUs. Each in-vehicle ECU contains a computer that includes at least one processor and at least one memory. Each in-vehicle ECU may include a plurality of microcomputers in the form of, for example, a main microcomputer and a sub-microcomputer.

In the vehicle 100, the OTA master 110 and each ECU are connected to each other via a communication bus, and are configured to communicate with each other by wire. In the vehicle 200, the ECUs are connected to each other via a communication bus, and are configured to communicate with each other by wire. The method for communication between the control devices in each vehicle may be, for example, but is not particularly limited to, a Controller Area Network (CAN) or Ethernet (registered trademark).

The OTA master 110 includes a processor 111, a memory 112, and a communication module 113. The processor 111 includes, for example, a CPU. The memory 112 includes a non-volatile memory such as a flash memory. The communication module 113 includes a communication OF for direct wireless communication with the OTA center 500. For example, the communication module 113 specifies the address of the OTA center 500 and accesses the communication network NW. Wireless communication is thus established between the vehicle 100 (communication module 113) and the OTA center 500. The communication module 113 may include a telematics control unit (TCU) and/or a Data Communication Module (DCM) that performs wireless communication.

In the vehicle 200, the ECU 210 includes a processor 211 and a memory 212. The processor 211 includes, for example, a CPU. The memory 212 includes a non-volatile memory such as a flash memory. The vehicle 200 further includes a communication device 290. The ECU 210 communicates with devices outside the vehicle 200 through the communication device 290. The communication device 290 includes a communication OF for direct wireless communication with the user equipment 300. The communication device 290 and the user equipment 300 may perform short-range communication such as a wireless local area network (LAN), near field communication (NFC), or Bluetooth (registered trademark). The communication device 290 may communicate directly with the user equipment 300 that is present inside the vehicle 200 or around the vehicle 200. The user equipment 300 that is present inside or outside the vehicle 200 and the ECU 210 may send and receive information to and from each other via the communication device 290 while the vehicle 200 is at a complete stop. The user equipment 300 that is present inside the vehicle 200 and the ECU 210 may send and receive information to and from each other via the communication device 290 while the vehicle 200 is traveling. The ECU 210 can communicate with the OTA center 500 via the user equipment 300 by requesting the user equipment 300 to communicate with the OTA center 500 as described above.

In the vehicle 100, the OTA master 110 can communicate with the user equipment 300a via the communication module 113 and a communication device 190. The communication device 190 includes a communication OF for direct wireless communication with the user equipment 300a. The communication device 190 and the user equipment 300a may perform short-range communication such as wireless LAN, NFC, or Bluetooth (registered trademark). The communication device 190 may communicate directly with the user equipment 300a that is present inside the vehicle 100 or around the vehicle 100. The user equipment 300a that is present inside or outside the vehicle 100 and the OTA master 110 may send and receive information to and from each other via the communication device 190 while the vehicle 100 is at a complete stop. The user equipment 300a that is present inside the vehicle 100 and the OTA master 110 may send and receive information to and from each other via the communication device 190 while the vehicle 100 is traveling. The OTA master 110 can communicate with the OTA center 500 via the user equipment 300a by requesting the user equipment 300a to communicate with the OTA center 500 as described above.

As described above, each of the OTA master 110 of the vehicle 100 and the ECU 210 of the vehicle 200 is configured to communicate wirelessly with the OTA center 500. Each of the vehicles 100, 200 can communicate with the OTA center 500 both while the vehicle is at a complete stop and while the vehicle is traveling. Each of the OTA master 110 and the ECU 210 manages in-vehicle information, receives a campaign, and manages a software update sequence. Hereinafter, the OTA master 110 and the ECU 210 will be referred to as "update masters" when not distinguished from each other. The OTA master 110 is the update master of the vehicle 100, and the ECU 210 is the update master of the vehicle 200.

The vehicles 100, 200 are autonomous vehicles configured to perform automated driving. The vehicles 100, 200 are configured to perform both manned travel and unmanned travel. Although the vehicles 100, 200 are configured to perform unmanned autonomous travel, the vehicles 100, 200 can also be manually driven by the user (manned travel). The vehicles 100, 200 can also perform automated driving (e.g., auto cruise control) during manned travel. The level of automated driving may be fully automated driving (level 5), or may be conditional automated driving (e.g., level 4).

Each of the vehicles 100, 200 further includes a driving device 130, 230 and an autonomous driving system (ADS) 140, 240, respectively. In the vehicle 100, the ECU 121 is configured to control the driving device 130. In the vehicle 200, the ECU 221 is configured to control the driving device 230.

Each of the driving devices 130, 230 includes an accelerator device, a brake device, and a steering device. The accelerator device includes, for example, a motor generator (hereinafter referred to as "MG") that rotates drive wheels of the vehicle, a power control unit (PCU) that drives the MG, and a battery that supplies electric power for driving the MG to the PCU.

Each of the ADSs 140, 240 includes a perception sensor that perceives the surroundings of the vehicle (e.g., at least one of the following sensors: a camera, a millimeter wave radar, and a Light Detection and Ranging (LiDAR) sensor). Each of the ADSs 140, 240 performs a process related to automated driving, based on information sequentially acquired by the perception sensor. Each of the ADSs 140, 240 cooperates with the ECU 121, 221, respectively, to generate a travel plan (information indicating the future behavior of the vehicle) according to the surroundings of the vehicle. Each of the ADSs 140, 240 then requests the ECU 121, 221 to control various actuators in the driving device 130, 230 to cause the vehicle 100, 200 to travel according to the travel plan, respectively.

Each of the vehicles 100, 200 further includes a start switch 150, 250 and a human-machine interface (HMI) device 170, 270, respectively.

Each of the start switches 150, 250 is a switch for the user to start a vehicle system (control system for the vehicle 100, 200, respectively), and is installed in, for example, a vehicle cabin. The start switch is commonly referred to as "power switch" or "ignition switch." The vehicle system (including each ECU installed in the vehicle) is switched between on (activated) and off (deactivated) when the user operates the start switch 150, 250. When the start switch 150, 250 is turned on, the vehicle system in the deactivated state is started and switched to the activated state (hereinafter also referred to as "IG-ON"). When the start switch 150, 250 is turned off while the vehicle system is in the activated state, the vehicle system is switched the deactivated state (hereinafter also referred to as "IG-OFF").

The operation to turn on the start switch 150, 250 is an operation to switch the state of the vehicle from IG-OFF to IG-ON. When the user turns on the start switch 150, 250, a start request is input to each in-vehicle ECU. That is, each in-vehicle ECU receives the start request from the user. The operation to turn off the start switch 150, 250 is an operation to switch the state of the vehicle from IG-ON to IG-OFF. When the user turns off the start switch 150, 250, a shutdown request is input to each in-vehicle ECU. That is, each in-vehicle ECU receives the shutdown request from the user. The operation to turn off the start switch 150, 250 is prohibited while the vehicle is traveling.

Each of the HMI devices 170, 270 includes an input device and a display device. Each of the HMI devices 170, 270 may include a touch panel display that functions as both an input device and a display device. Each of the HMI devices 170, 270 may include an input device and display device of a car navigation system.

FIG. 2 illustrates an overview of a software update method using the OTA technology. Referring to FIG. 2 together with FIG. 1, a process related to software update is performed according to a procedure including configuration synchronization, campaign notification and acceptance of application, download, installation, activation, and software update completion notification. The process described below is performed by the OTA center 500 and each vehicle (including the vehicles 100, 200) that receives software distribution from the OTA center 500. The number of vehicles that receive the distribution from the OTA center 500 may be about 50, may be 100 or more and less than 1000, or may be 1000 or more.

The vehicle in the IG-ON state repeats the configuration synchronization every preset time period. The vehicle in the IG-ON state also performs the configuration synchronization when it receives a request for configuration synchronization from the OTA center 500. The configuration synchronization process that is performed by the vehicle includes sending vehicle configuration information to the OTA center 500. The vehicle configuration information includes, for example, hardware information (information indicating product numbers of hardware, identifiers of the ECUs, etc.) and software information (information indicating product numbers of software etc.) of the individual ECUs in the vehicle.

When the OTA center 500 receives the vehicle configuration information from the vehicle, the OTA center 500 checks for any currently available campaign (software update). When there is any campaign that is applicable to the vehicle, the OTA center 500 sends an accept request signal that requests the user of the vehicle to accept download of new software (updated version of software) related to that campaign. The accept request signal includes information on the campaign (campaign information). The campaign information may include, for example, at least one of the following pieces of information: campaign attribute information (information indicating the purpose of the software update, the function(s) of the vehicle that can be affected by the update, etc.), a list of vehicles eligible for the campaign, information on ECUs eligible for the campaign (e.g., software information before and after the update), and information on notifications to be sent to the user before and after the update. The campaign to be notified may be a newly available campaign or may be a campaign that was not previously applied. Hereinafter, sending of the accept request signal will also be referred to as "campaign notification."

When the vehicle receives a campaign notification (accept request signal), the vehicle 100 requests the user to enter whether to accept to apply the campaign to the vehicle. For example, the vehicle displays a message such as "New software is available. Do you want to apply this software to this vehicle?" on the in-vehicle HMI device (HMI device 270, 170) or the user equipment 300, 300a to request the user to enter an input indicating either "accept" or "decline." When the user enters an input indicating "accept," the vehicle performs a process related to download that will be described below. When the user enters an input indicating "decline," the vehicle does not perform the process related to download. In this case, the OTA center 500 ends the process related to software update without proceeding to the download phase.

In the present embodiment, the OTA center 500 and the update master of the vehicle (e.g., the OTA master 110 or the ECU 210) perform the process related to download according to the following procedure.

The update master of the vehicle requests a distribution package including the new software from the OTA center 500. The update master then downloads (receives and saves) the distribution package from the OTA center 500. The distribution package may include, in addition to the new software (e.g., a set of update data for each of the ECUs eligible for the campaign), package attribute information (information indicating the update category, the number of pieces of update data in the distribution package, the order of installation in the ECUs, etc.), and update data attribute information (an identifier of a target ECU, verification data for verifying the validity of the update data, etc.). The target ECU is an ECU whose software is to be updated. For example, the target ECU may be the ECU 121 or 221, and the software to be updated may be an automated driving control program.

The distribution package is saved in a storage device of the update master (e.g. the memory 112 or 212) through the process related to download described above. After the download is completed, the update master verifies the authenticity of the downloaded distribution package. When the verification result is "normal," the update master notifies the OTA center 500 of the software update status (completion of the download). This notification means that the download was successful.

After the successful download, the vehicle performs installation. The update master requests at least one target ECU (e.g. the ECU 121 or 221) to output the state of the target ECU and a diagnostic trouble code (DTC). The update master determines for each target ECU whether the target ECU can perform installation, based on the state of the target ECU and the DTC. The update master transfers the new software (update data) to the target ECU that can perform installation. When the target ECU receives the update data, the target ECU installs the received update data (writes the received update data to a non-volatile memory).

When the transfer of the update data from the update master to the target ECU is completed, the target ECU sends a transfer completion notification to the update master. When the update master receives the transfer completion notification, the update master requests the target ECU to perform integrity verification. In response to this request, the target ECU performs verification using integrity verification data (verification data), and sends the verification result to the update master. The update master saves the verification result (whether the installation was completed, failed, or was cancelled) from each target ECU. When the integrity verification is completed by all the target ECUs and the verification results from all the target ECUs are "normal," the update master notifies the OTA center 500 of the software update status (completion of the installation). This notification means that the installation was successful.

After the installation is successfully performed following the successful download, the vehicle waits for activation. When the start switch of the vehicle (e.g., the start switch 150 or 250) is subsequently turned off, the update master displays a predetermined message on the in-vehicle HMI device or the user equipment 300, 300a to request the user to enter an input indicating either "accept" or "decline." When the user enters an input indicating "accept," the update master performs activation (activation of the installed software). When the activation fails, the update master requests the OTA center 500 to rollback the software. In response to the rollback request from the vehicle, the OTA center 500 distributes rollback software to the vehicle. The update master can thus restore (roll back) the software that was not successively activated to its original version by using the rollback software. When the user enters an input indicating "decline," the update master cancels the process related to software update without performing the activation, and the vehicle system is shut down.

When the update master has successfully performed the activation, the update master displays the result of the software update on the in-vehicle HMI device or the user equipment 300, 300a. The update master then notifies the OTA center 500 of the software update status (completion of the software update). This notification means that the OTA software update was successful. In response to this notification, the control system for the vehicle is shut down, and the vehicle system is switched to IG-OFF. When the start switch of the vehicle is subsequently turned on, the vehicle system is switched to IG-ON. An update program (new version of the software) is thus started on the target ECU. The software to be updated is not limited to a control program for a driver assistance system such as the automated driving control program described above, and may be any software.

As described above, when a distribution package (software) is downloaded and software on the target ECU is updated, the user is requested to enter whether to accept the software update process (whether to accept to apply the campaign to the vehicle). In this case, when downloading software (distribution package) distributed from the OTA center 500 via the user equipment 300, 300a, performing the accept operation using the in-vehicle HMI device even though the user has the user equipment 300, 300a at hand may be a hassle for the user. In the present embodiment, whether to accept the update process (whether to consent to the update process) is displayed on the user equipment 300, 300a in order to improve user convenience when performing a software update process on an in-vehicle ECU via the user equipment 300, 300a.

Figure 3:
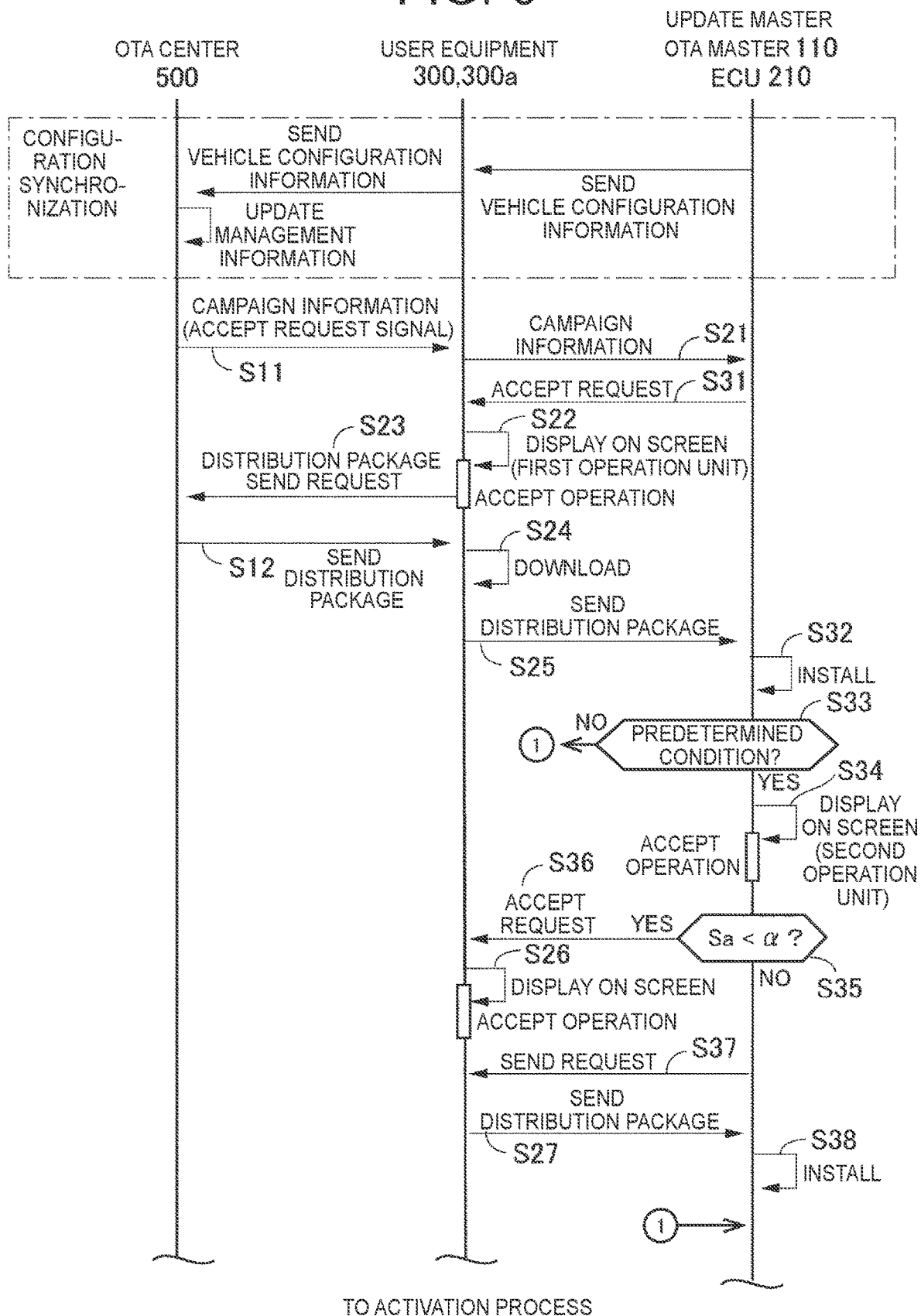
FIG. 3 schematically shows part of a sequence that is performed in the software update system according to the embodiment.

FIG. 3 schematically shows part of a sequence that is performed in the software update system according to the present embodiment. This sequence is processed in the OTA center 500, the user equipment 300 or the user equipment 300a, and the update master (OTA master 110, ECU 210). This process is implemented by one or more processors of each device reading and executing a program stored in one or more memories.

The sequence shown in FIG. 3 is a sequence that is performed when downloading software via the user equipment 300 or the user equipment 300a. The vehicle 100 can either download software distributed from the OTA center 500 using the communication module 113 of the OTA master 110 (without via the user equipment 300a) or download the software distributed from the OTA center 500 via the user equipment 300a. In the vehicle 100, the sequence of FIG. 3 is performed when the user sets the vehicle 100 to download software via the user equipment 300a, or when a notification (instruction) to receive a campaign notification via the user equipment 300a is sent from the OTA master 110.

Referring to FIG. 3, when the configuration synchronization process ends and there is any campaign that is applicable to the vehicle, the OTA center 500 sends campaign information (accept request signal) to the user equipment 300, 300a in step (hereinafter abbreviated as "S") 11. In the configuration synchronization process, vehicle configuration information is sent from the update master (ECU 210 or OTA master 110) to the OTA center 500 via the user equipment 300, 300a. When the user equipment 300, 300a receives the campaign information, the user equipment 300, 300a sends the received campaign information to the update master (S21). When the update master receives the campaign information, the update master sends an accept request to the user equipment 300, 300a (S31). This accept request requests the user equipment 300, 300a to accept download of the distribution package (software) distributed from the OTA center 500, and notifies (instructs) to display whether to accept download of the distribution package (whether to accept to apply the campaign to the vehicle 100, 200) on the user equipment 300, 300a. The update master (OTA master 110, ECU 210) is an example of the "control unit" of the present disclosure.

Figure 4:
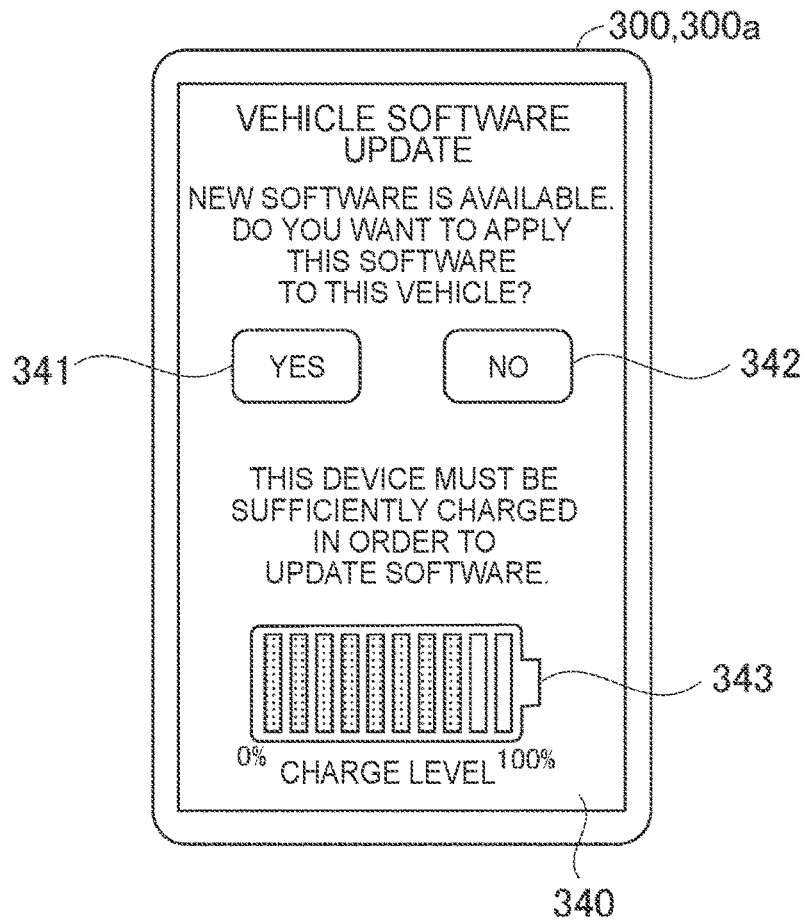
FIG. 4 shows an example of a display screen displayed on a touch panel display of user equipment.

In response to the accept request, the user equipment 300, 300a displays on its touch panel display 340 an operation unit (operation button) for accepting download (S22). FIG. 4 shows an example of a display screen displayed on the touch panel display 340 of the user equipment 300, 300a. As shown in FIG. 4, a message indicating a vehicle software update process and the operation unit for accepting software download are displayed on the touch panel display 340. In FIG. 4, a "YES" button 341 is the operation unit (operation button) for accepting download, and is an example of the "first operation unit" of the present disclosure. When the user operates the "YES" button 341, software download (software update process) is performed. When the user operates a "NO" button 342 displayed on the touch panel display 340, the software download (software update process) is not performed, and the sequence ends.

Referring to FIG. 4, a charge level 343 of a battery of the user equipment 300, 300a is displayed on the touch panel display 340. The charge level 343 indicates the current amount of charge in the battery. For example, the state of charge (SOC) of the battery of the user equipment 300, 300a may be displayed as the charge level 343. The user equipment 300, 300a displays the charge level 343 on the touch panel display 340 in response to the accept request sent from the update master. The accept request that is sent from the update master may include an instruction to display the charge level 343 of the battery of the user equipment 300, 300a on the touch panel display 340, and the charge level 343 may be displayed on the touch panel display 340 according to this instruction.

Referring back to FIG. 3, when the user operates the "YES" button 341 on the touch panel display 340 to perform an operation of accepting the download (software update process), the user equipment 300, 300a sends a distribution package send request to the OTA center 500 (S23). In response to the distribution package send request, the OTA center 500 sends the distribution package (software) to the user equipment 300, 300a (S12).

The user equipment 300, 300a then saves the distribution package sent (distributed) from the OTA center 500 in the memory 320 to download the distribution package (S24). When the user equipment 300, 300a finishes downloading the distribution package, the user equipment 300, 300a sends the downloaded distribution package to the update master (S25). When the distribution package is sent from the user equipment 300, 300a to the update master, the update master downloads (receives and saves) the distribution package as described above. After completing the download, the update master verifies the authenticity of the distribution package, etc. The update master then transfers the new software (update data) to the target ECU to install the update data (S32).

Subsequently, in S33, the update master determines whether a predetermined condition is satisfied. For example, the predetermined condition may be (A) when the download has not been completed (such as part of the distribution package downloaded by the user equipment 300, 300a has not been sent to the update master (the update master has not been able to receive part of the distribution package downloaded by the user equipment 300, 300a)) even after a predetermined time has elapsed since the update master started receiving the distribution package, or (B) when the installation has not been completed even after a predetermined time has elapsed since the update master started receiving the distribution package. When the predetermined condition is not satisfied, the determination result in S33 is NO. Therefore, the update master waits for activation, and the activation process is subsequently performed.

Figure 5:
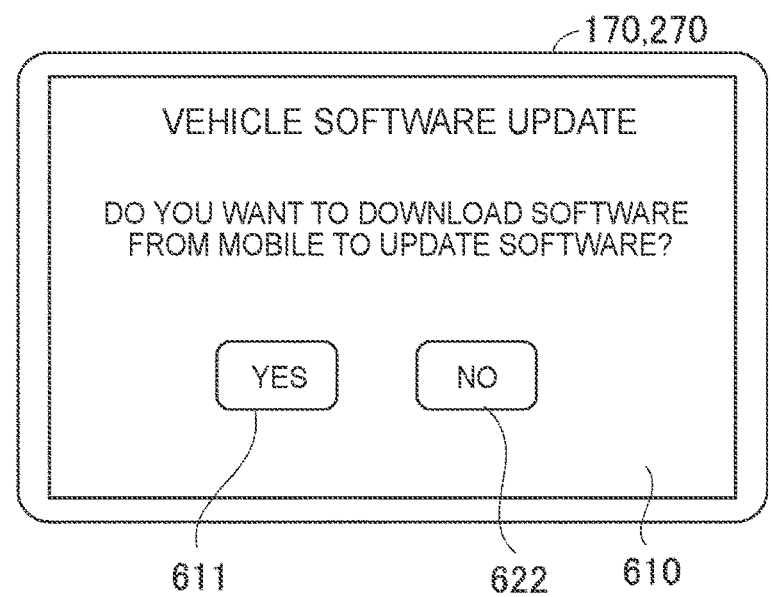
FIG. 5 shows an example of a display screen displayed on a touch panel display of an HMI device.

When the predetermined condition is satisfied, the determination result in S33 is YES. Therefore, an operation unit (operation button) for accepting software download is displayed on a touch panel display 610 of the HMI device 170, 270 (S34). FIG. 5 shows an example of a display screen displayed on the touch panel display 610 of the HMI device 170, 270. As shown in FIG. 5, a message indicating a vehicle software update process and the operation unit for accepting software download are displayed on the touch panel display 610. In FIG. 5, a "YES" button 611 is the operation unit (operation button) for accepting download, and is an example of the "second operation unit" of the present disclosure. When the user operates the "YES" button 611 on the touch panel display 610 to perform an operation of accepting the download (software update process), the update master determines in S35 whether a charge level Sa of the battery of the user equipment 300, 300a is less than a predetermined value α. The charge level Sa may be the SOC of the battery. The predetermined value α is an example of the "first predetermined value" of the present disclosure. When the user operates a "NO" button 622 displayed on the touch panel display 610, the user equipment 300, 300a does not send the software to the update master, and the sequence ends.

Figure 6:
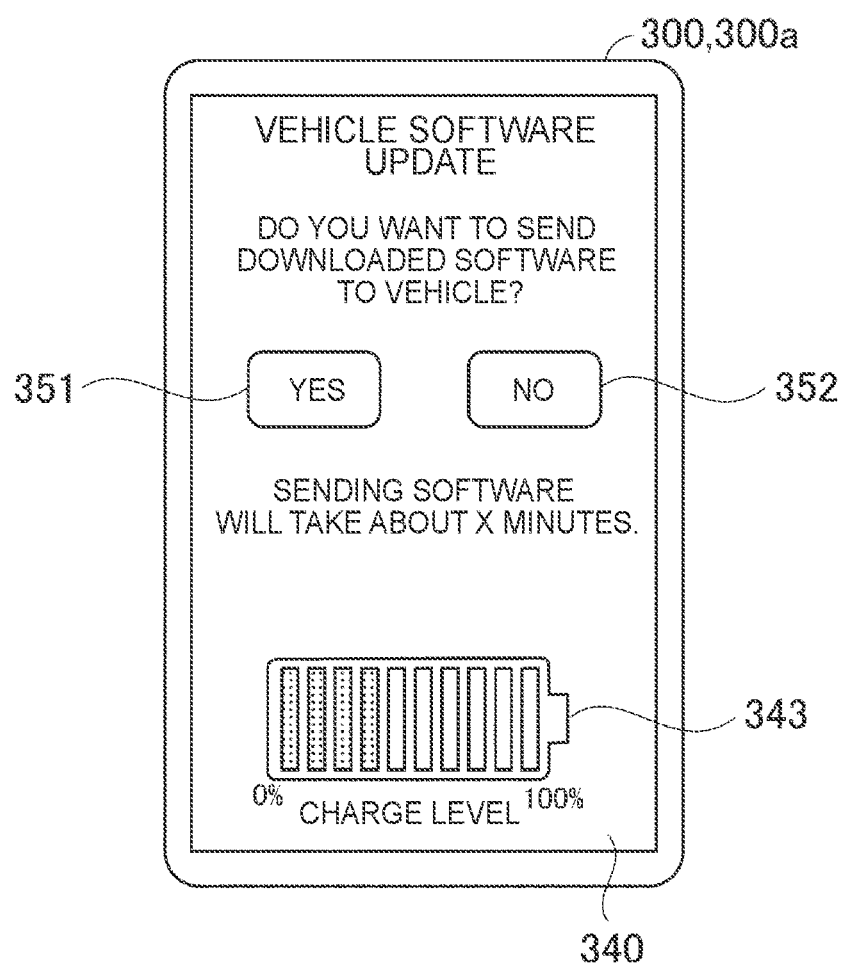
FIG. 6 shows an example of a display screen displayed on the touch panel display of the user equipment.

Referring back to FIG. 3, when the charge level Sa is less than the predetermined value α (Sa<α), the determination result in S35 is YES, and the update master sends an accept request to the user equipment 300, 300a (S36). In response to the accept request, the user equipment 300, 300a displays on the touch panel display 340 an operation unit (operation button) for accepting software download (sending of the software from the user equipment 300, 300a to the update master) (S26). FIG. 6 shows an example of a display screen displayed on the touch panel display 340 of the user equipment 300, 300a. As shown in FIG. 6, a message indicating a vehicle software update process and the operation unit for accepting software download (operation unit for accepting sending of the software saved in a storage unit of the user equipment 300, 300a) are displayed on the touch panel display 340. In FIG. 6, a "YES" button 351 is the operation unit for accepting download (operation unit for accepting sending of the software). When the user operates the "YES" button 351, the user equipment 300, 300a sends the software (distribution package) saved in the memory 320 to the update master (S27). When the user operates a "NO" button 352 displayed on the touch panel display 340, the user equipment 300, 300a does not send the software (distribution package) to the update master, and the sequence ends.

Referring back to FIG. 3, when the charge level Sa is equal to or higher than the predetermined value α (Sa≥α), the determination result in S35 is NO, and the update master sends a send request to the user equipment 300, 300a (S37). In response to the send request, the user equipment 300, 300a sends the software (distribution package) saved in the memory 320 to the update master (S27). When the update master receives the software (distribution package) from the user equipment 300, 300a, the update master installs the update data (S38) as in S32. The update master then waits for activation, and the activation process is subsequently performed.

According to the present embodiment, the update master (ECU 210, OTA master 110) can communicate with the user equipment 300, 300a via the communication device 290, 190, and can download the software (distribution package) distributed from the OTA center 500 via the user equipment 300, 300a, respectively. When the update master downloads the software distributed from the OTA center 500 via the user equipment 300, 300a, the update master requests the user equipment 300, 300a to accept the download (S31). When the software is downloaded via the user equipment 300, 300a, the user equipment 300, 300a is requested to accept the download. This allows the user to perform an accept operation using the user equipment 300, 300a the user has at hand. This can improve user convenience.

According to the present embodiment, the accept request (S31) may include a request to display the "YES" button 341 (first operation unit) for accepting download and the charge level of the battery of the user equipment 300, 300a on the touch panel display 340 of the user equipment 300, 300a. This allows the user to take the charge level 343 displayed on the touch panel display 340 of the user equipment 300, 300a into consideration before operating the "YES" button 341 to accept the download. This can reduce the possibility of the battery of the user equipment 300, 300a running out during the software download.

According to the present embodiment, when the predetermined condition is satisfied, such as (A) when the download has not been completed even after the predetermined time has elapsed since the update master started receiving the distribution package or (B) when the installation has not been completed even after the predetermined time has elapsed since the update master started receiving the distribution package, the update master displays on the touch panel display 610 of the HMI device 170, 270 the "YES" button 611 (second operation unit) for accepting the download. This allows the user to accept the download by operating the "YES" button 611 displayed on the touch panel display 610. This can improve user convenience and facilitate the software update process.

According to the present embodiment, in the case where the charge level Sa of the battery of the user equipment 300, 300a is less than the predetermined value α when the user accepts the download by operating the "YES" button 611 (second operation unit) displayed on the HMI device 270, 170, the user equipment 300, 300a is requested to accept the download (S36, S26). Accordingly, when the charge level Sa is less than the predetermined value α and is not high enough to download the software, the user is requested to operate the user equipment 300, 300a to perform an accept operation. This motivates the user to perform the accept operation after checking the charge level Sa of the battery of the user equipment 300, 300a. In the case where the charge level Sa is equal to or higher than the predetermined value α when the user accepts the download by operating the "YES" button 611 displayed on the HMI device 270, 170, the download is performed without requesting the user equipment 300, 300a to accept the download (S37). Accordingly, user convenience is less likely to be reduced.

First Modification

Figure 7:
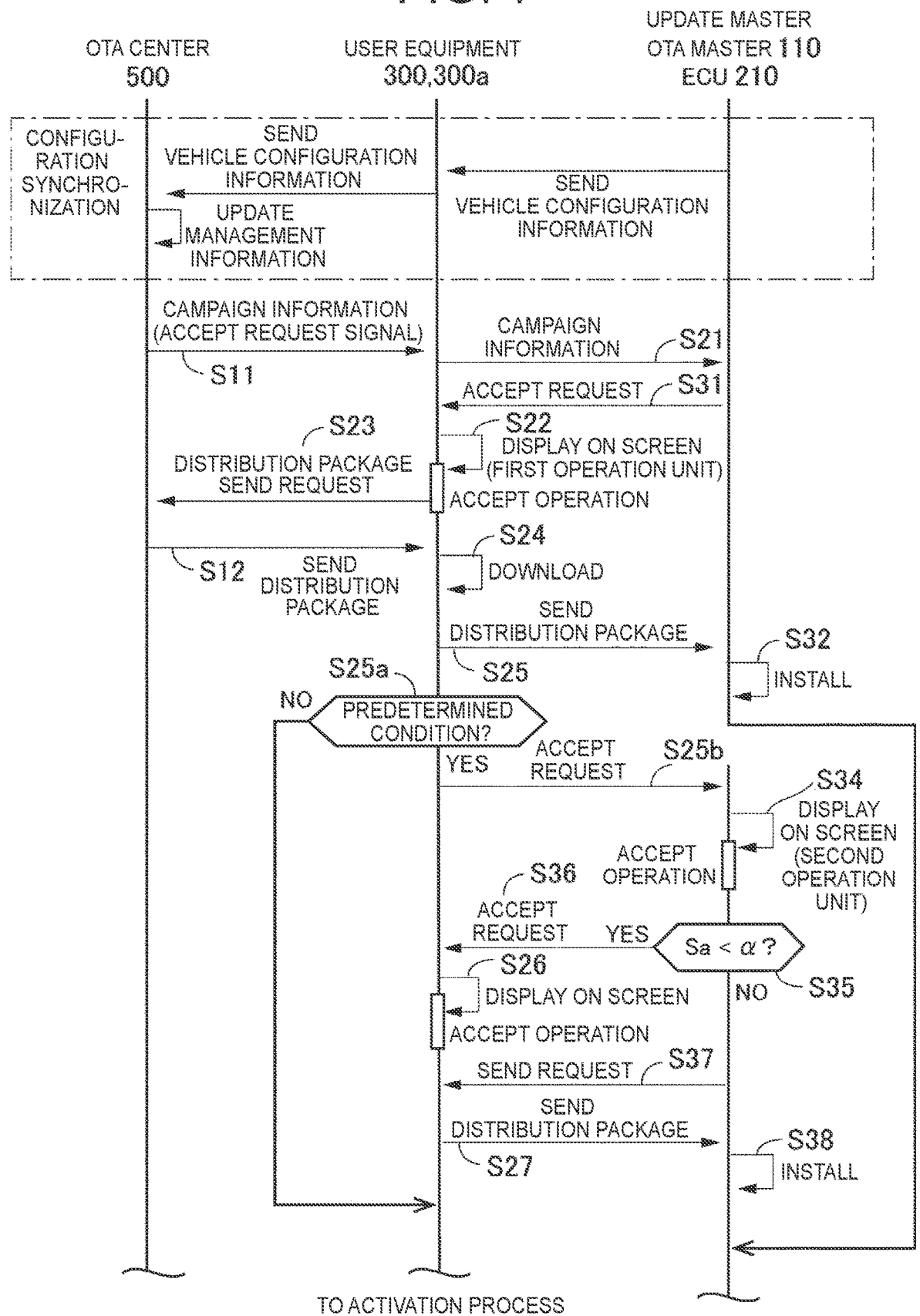
FIG. 7 schematically shows part of a sequence that is performed in the software update system according to a first modification.

FIG. 7 schematically shows part of a sequence that is performed in the software update system according to a first modification. In the above embodiment, the update master (OTA master 110, ECU 210) determines in S33 whether the predetermined condition is satisfied. In the first modification, the user equipment 300, 300a determines whether a predetermined condition is satisfied. In the sequence of FIG. 7, S33 in FIG. 6 is replaced with S25a, and S25b is added.

Referring to FIG. 7, when the user equipment 300, 300a sends the downloaded distribution package to the update master (S25), the update master transfers the new software to the target ECU as described above to install the update data (S32). After sending the downloaded distribution package to the update master (S25), the user equipment 300, 300a determines in S25a whether the predetermined condition is satisfied. For example, the predetermined condition may be (a) when the download has not been completed in the update master (part of the distribution package downloaded by the user equipment 300, 300a has not been sent to the update master (the update master has not been able to receive part of the distribution package downloaded by the user equipment 300, 300a)) even after a predetermined time has elapsed since the user equipment 300, 300a sent the distribution package, or (b) when the download has not been completed in the update master (part of the distribution package downloaded by the user equipment 300, 300a has not been sent to the update master (the update master has not been able to receive part of the distribution package downloaded by the user equipment 300, 300a)) even after a predetermined time has elapsed since the user equipment 300, 300a sent the distribution package, and the available capacity of the storage area (memory 320) of the user equipment 300, 300a has become less than a predetermined value. When the predetermined condition is not satisfied, the determination result in S25a is NO. Therefore, the user equipment 300, 300a waits for activation, and the activation process is subsequently performed.

When the predetermined condition is satisfied, the determination result in S25a is YES, and the user equipment 300, 300a sends an accept request to the update master (S25b). In response to the accept request, the update master displays on the touch panel display 610 of the HMI device 170, 270 the operation unit (operation button) for accepting software download (S34). Since the subsequent steps are the same as those of the above embodiment, description thereof will be omitted.

According to the first modification, when the predetermined condition is satisfied, such as (a) when part of the distribution package downloaded by the user equipment 300, 300a has not been sent to the update master even after the predetermined time has elapsed since the user equipment 300, 300a sent the distribution package or (b) when part of the distribution package downloaded by the user equipment 300, 300a has not been sent to the update master even after the predetermined time has elapsed since the user equipment 300, 300a sent the distribution package and the available capacity of the storage area of the user equipment 300, 300a has become less than the predetermined value, the user equipment 300, 300a requests the update master to display on the touch panel display 610 of the HMI device 270, 170 the "YES" button 611 (second operation unit) for accepting the download. This allows the user to accept the download by operating the "YES" button 611 displayed on the touch panel display 610. This can improve user convenience and facilitate the software update process. The first modification has similar functions and effects to those of the above embodiment.

Second Modification

Figure 8:
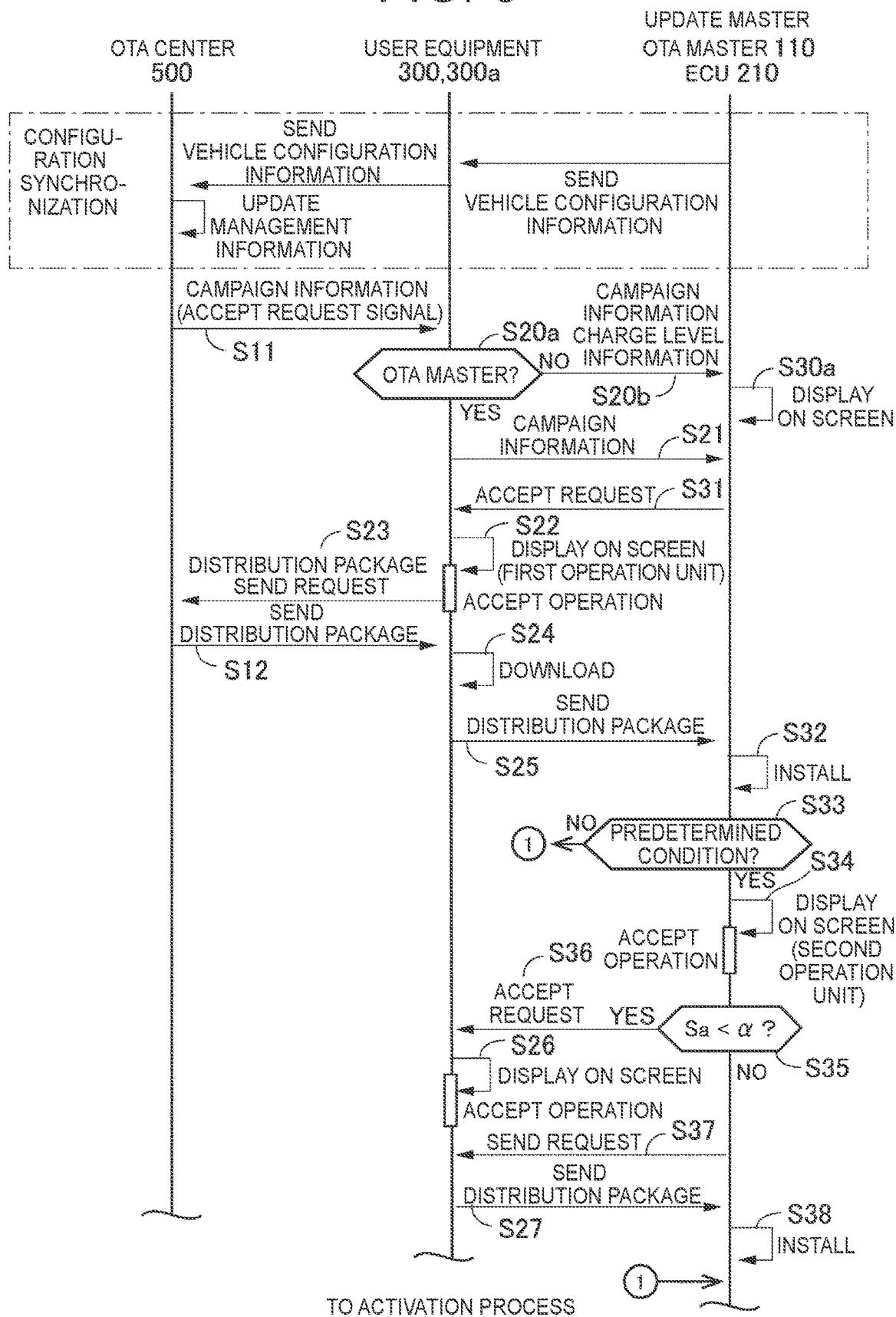
FIG. 8 schematically shows part of a sequence that is performed in the software update system according to a second modification.

FIG. 8 schematically shows part of a sequence that is performed in the software update system according to a second modification. In the second modification, S20a, S20b, and S30a are added before S21 in the sequence of the above embodiment (FIG. 3).

Referring to FIG. 8, when the user equipment 300, 300a receives campaign information, the update master determines whether the update master is the OTA master 110 (S20a). Information on the update master (information as to whether the update master is the OTA master 110 or the ECU 210) is included in the vehicle configuration information sent from the update master in the configuration synchronization process. When the update master is the ECU 210, the determination result in S20a is NO, and the user equipment 300 sends the campaign information and information on the charge level (SOC) of the battery of the user equipment 300 to the update master (ECU 210) (S20b).

Figure 9:
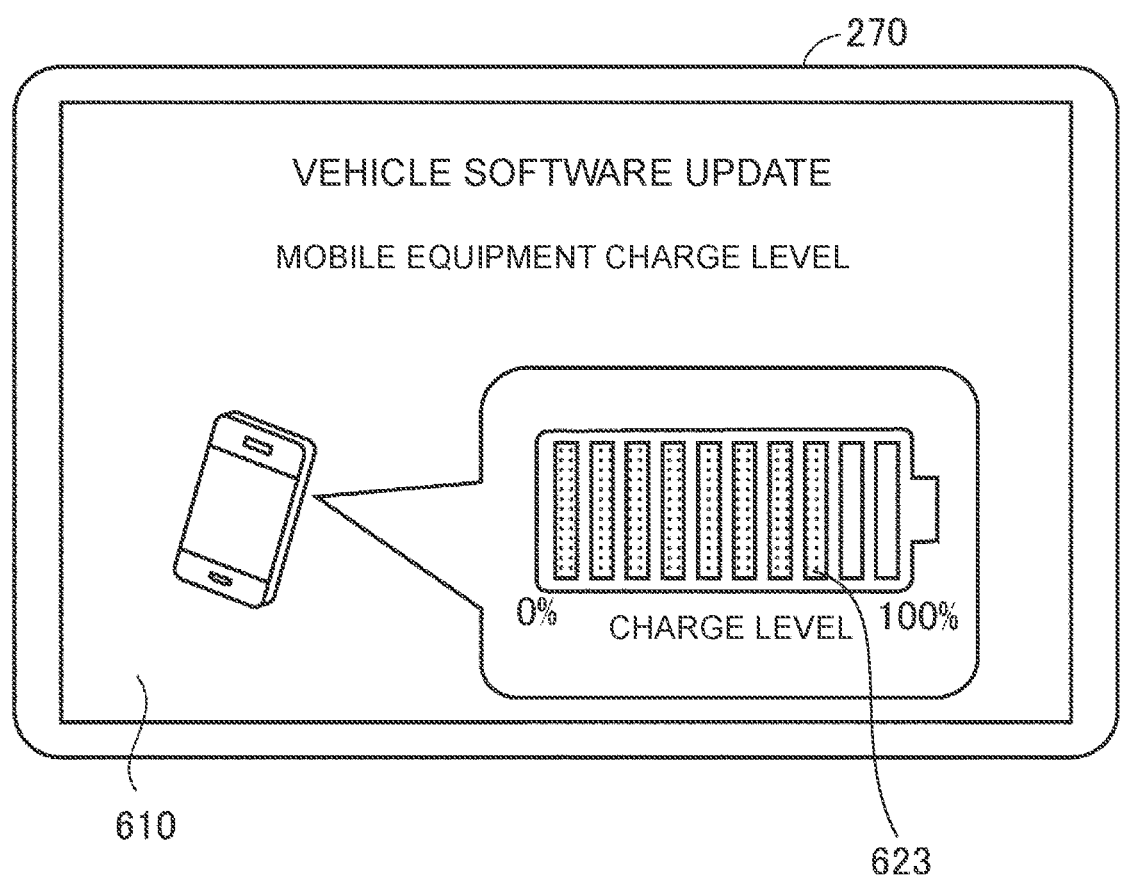
FIG. 9 shows an example of a display screen displayed on the touch panel display of the HMI device.

When the update master (ECU 210) receives the campaign information and the information on the charge level, the update master (ECU 210) displays the charge level of the battery of the user equipment 300 on the touch panel display 610 of the HMI device 270 (S30a). FIG. 9 shows an example of a display screen displayed on the touch panel display 610 of the HMI device 270. As shown in FIG. 9, a message indicating a vehicle software update process and a charge level 623 of the battery of the user equipment 300 are displayed on the touch panel display 610.

When the update master is the OTA master 110, the determination result in S20a is YES, and the user equipment 300a sends the campaign information to the update master (OTA master 110) (S21). Since the subsequent steps are the same as the sequence of the above embodiment (FIG. 3), description thereof will be omitted.

According to the second modification, in the case where the vehicle (e.g., the vehicle 100) includes a communication unit configured to communicate with the OTA center 500 (OTA master 110, communication module 113), the charge level of the battery of the user equipment 300a is not displayed on the HMI device 170. When the vehicle is configured to communicate with the OTA center 500, the vehicle sometimes downloads the software distributed from the OTA center 500 without via the user equipment 300a and performs the software update process. Therefore, in the case where the vehicle includes a communication unit configured to communicate with the OTA center 500, the charge level of the battery of the user equipment 300a is not displayed on the HMI device 170. This eliminates the need to transfer the information on the charge level of the battery of the user equipment 300a between the vehicle and the user equipment 300a, and can thus reduce the communication load. In the case where the vehicle (e.g., vehicle 200) does not include a communication unit configured to communicate with the OTA center 500, the charge level of the battery of the user equipment 300 is displayed on the HMI device 270. In the case where the vehicle does not include a communication unit configured to communicate with the OTA center 500, the software is downloaded via the user equipment 300. Therefore, displaying the charge level of the battery of the user equipment 300 on the HMI device 270 allows the user to easily check the charge level of the battery of the user equipment 300 when performing an operation of accepting the download. This can reduce the possibility of the battery of the user equipment 300 running out during the software download.

In the above description, various types of information are displayed on the touch panel display 340. However, the display is not limited to that with a touch panel function, and may be a device (personal computer (PC) etc.) equipped with an operation unit separate from the display.

The vehicle need not necessarily be a vehicle configured to perform automated driving. The vehicle may be an electrified vehicle (xEV) other than a BEV. The vehicle may be a plug-in hybrid electric vehicle (PHEV) or hybrid electric vehicle (HEV) equipped with an internal combustion engine (e.g. a gasoline engine, a biofuel engine, or a hydrogen engine). The vehicle is not limited to a four-wheeled passenger vehicle, and may be a bus or a truck, or may be a three-wheeled xEV. The vehicle may have a flight function. The vehicle may be a Mobility-as-a-Service (MaaS) vehicle. The vehicle may be a multipurpose vehicle that is customized according to the user's intended use of the vehicle. The vehicle may be a mobile shop vehicle, a robotaxi, an automated guided vehicle (AGV), or an agricultural machine. The vehicle may be a small-sized unmanned or single-seater BEV (e.g., a last-mile BEV, an electric wheelchair, or an electric skateboard).

The embodiment disclosed herein should be construed as illustrative in all respects and not restrictive. The scope of the present disclosure is shown by the claims rather than by the above description of the embodiment and is intended to include all modifications within the meaning and scope equivalent to the claims.

What is claimed is:

1. A vehicle including an electronic control unit configured to update software, the vehicle comprising one or more processors configured to:
   communicate with user equipment; and
   when software distributed from a server is downloaded to the vehicle via the user equipment, request the user equipment to display on the user equipment,
   a first operation button that is used when a user accepts download of the distributed software, and a charge level of a battery of the user equipment,
   wherein: the vehicle includes a human-machine interface; the vehicle is configured to not display the charge level of the battery of the user equipment on the human-machine interface in a case where the one or more processors are configured to communicate with the server and the vehicle is configured to display the charge level of the battery of the user equipment on the human-machine interface in a case where the one or more processors are not configured to communicate with the server.

2. The vehicle according to claim 1, wherein the one or more processors are configured to display a second operation button on the human-machine interface when a predetermined condition is satisfied, the second operation button being an operation button that is used when the user accepts the download.

3. The vehicle according to claim 2, wherein the one or more processors are configured to perform the download without requesting the user equipment to accept the download in a case where the charge level of the battery of the user equipment is equal to or higher than a first predetermined value when the download is accepted by operating the second operation button, and request the user equipment to accept the download in a case where the charge level of the battery of the user equipment is less than the first predetermined value when the download is accepted by operating the second operation button.

4. A software update system that updates software on an electronic control unit, the software update system comprising:
   a server configured to distribute software;
   a vehicle equipped with the electronic control unit; and
   user equipment configured to communicate with the server and the vehicle, wherein the vehicle is configured to, when the software is downloaded to the vehicle via the user equipment, perform download of the software when a user accepts the download by operating the user equipment, wherein: the vehicle includes a human-machine interface; the vehicle is configured to not display a charge level of a battery of the user equipment on the human-machine interface in a case where the vehicle includes one or more processors configured to communicate with the server and the vehicle is configured to display the charge level of the battery of the user equipment on the human-machine interface in a case where the vehicle does not include the one or more processors configured to communicate with the server.

5. The software update system according to claim 4, wherein the user equipment is configured to display on the user equipment a first operation button that is used when the user accepts the download, and the charge level of the battery of the user equipment.

6. The software update system according to claim 4, wherein: the vehicle is configured to display a second operation button on the human-machine interface when a predetermined condition is satisfied, the second operation button being an operation button that is used when the user accepts the download.

7. The software update system according to claim 6, wherein the software update system is configured to perform the download without any operation on the user equipment in a case where the charge level of the battery of the user equipment is equal to or higher than a first predetermined value when the download is accepted by operating the second operation button, and perform the download when the user accepts the download by operating the user equipment in a case where the charge level of the battery of the user equipment is less than the first predetermined value when the download is accepted by operating the second operation button.

* * * * *